Feb. 26, 1935.  D. D. ARNER  1,992,164
COUPLING FOR CONNECTING A TRUCK AND A TRAILER
Filed Nov. 23, 1934  2 Sheets-Sheet 1
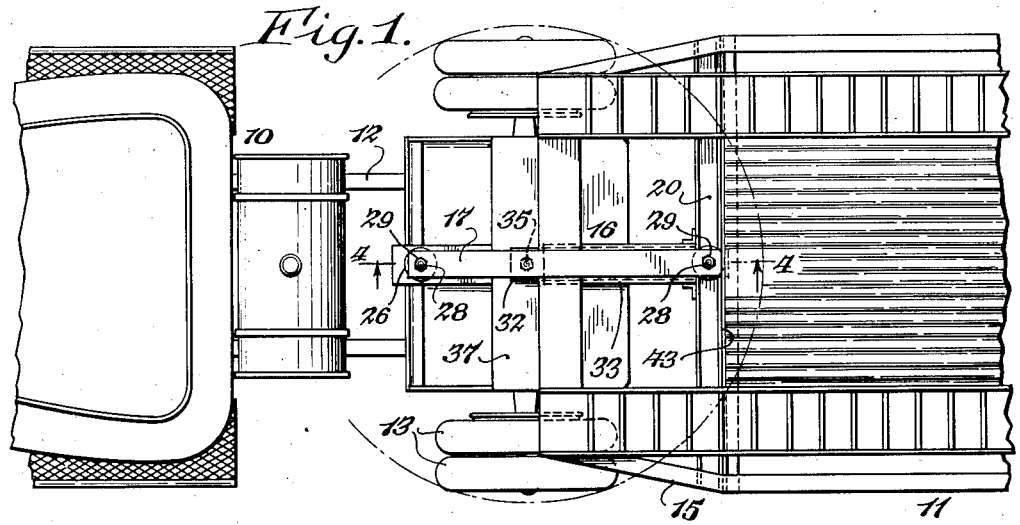
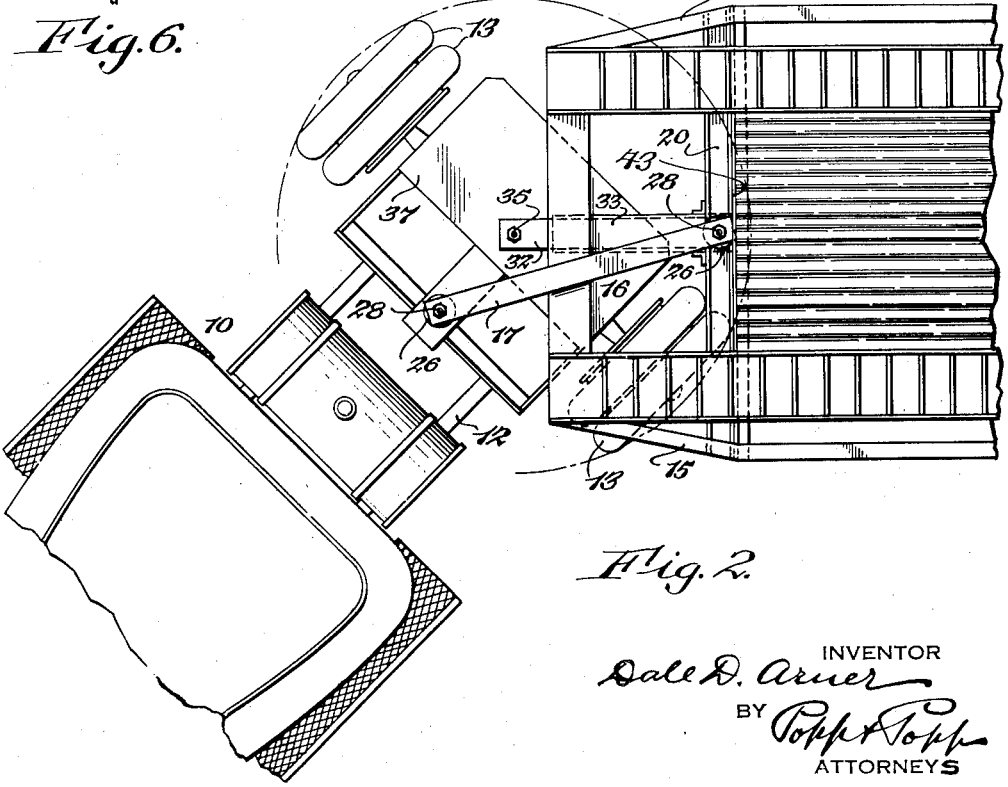
INVENTOR
Dale D. Arner
BY Popp & Popp
ATTORNEYS Feb. 26, 1935.   D. D. ARNER   1,992,164
COUPLING FOR CONNECTING A TRUCK AND A TRAILER
Filed Nov. 28, 1934   2 Sheets-Sheet 2
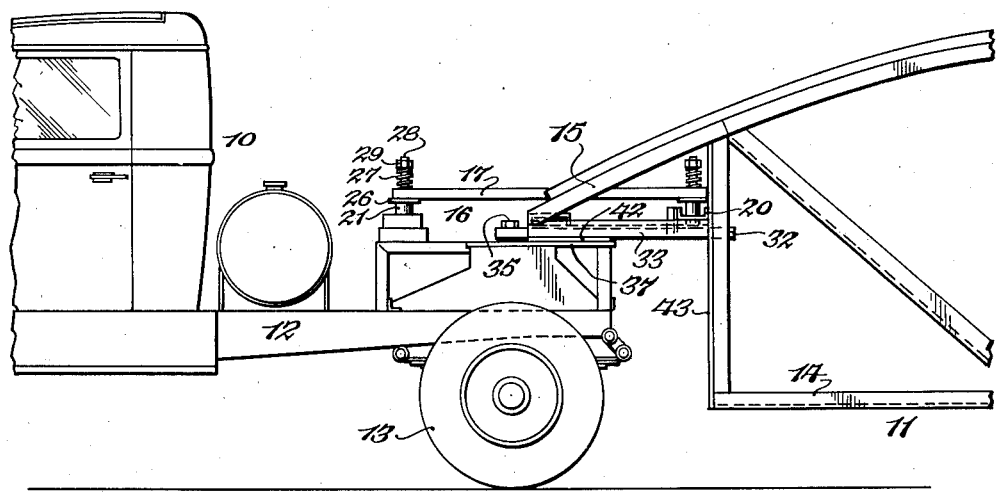
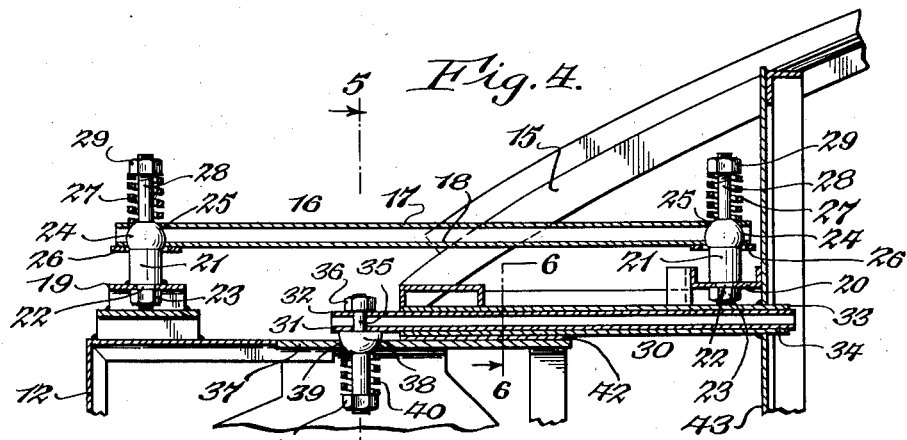
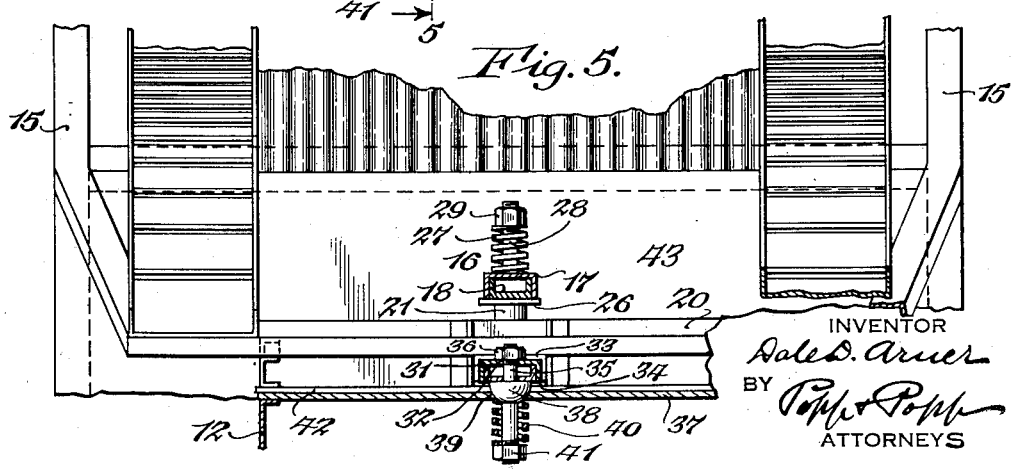
INVENTOR
Dale D. Arner
BY
Popp & Popp
ATTORNEYS Patented Feb. 26, 1935

1,992,164

UNITED STATES PATENT OFFICE 1,992,164

COUPLING FOR CONNECTING A TRUCK
AND A TRAILER

Dale D. Arner, Buffalo, N. Y.

Application November 28, 1934, Serial No. 755,225

9 Claims. (Cl. 280—33.1)

This invention relates to a coupling for connecting a truck or draft vehicle with a trailer upon which the load to be transported is carried.

One of the commonest means heretofore employed for this purpose is a draft link or bar pivotally connected at its opposite ends with the truck and trailer, which construction, however, is objectionable inasmuch as the same does not permit of controlling the position of the trailer relatively to the truck but instead permits the trailer to move laterally irregularly and thus necessitates using a draft link of considerable length in order to avoid the possibility of parts of the trailer and truck striking each other.

The use of such draft link also permits sidesway of the trailer so that a collision or side-swipe is possible with other vehicles on the road, and the use of such a link also renders it impossible to properly back up a trailer, and it also necessitates taking up too much room lengthwise on the road, as well as preventing parking of the truck and trailer in a relatively short space.

One of the objects of this invention is to provide a coupling for connecting a truck with a trailer, whereby the latter is connected very close to the truck and thus enables the truck and trailer to take up a minimum amount of space and permits of storing the same compactly, and whereby the trailer is also caused to maintain a definite relation with reference to the truck and track properly in rear of the same without possibility of any side-swaying of the trailer and without liability of any part of the trailer coming into engagement with any part of the truck while effecting a turning movement of the truck and trailer.

Another object of this invention is to accomplish this purpose by means which are of simple, durable and relatively inexpensive construction and which are so articulated that the truck and trailer are free to follow variations in the contour of the road independently of each other without liability of cramping any of the mechanism or injuring the same during the operation of propelling the trailer by the truck.

In the accompanying drawings:—

Figure 1 is a fragmentary top plan view of a truck and trailer embodying an approved form of my invention, showing the truck and trailer lengthwise in line with each other as they would be in travelling straight on a roadway.

Figure 2 is a similar view showing the position of the parts when the truck and trailer are making a turn.

Figure 3 is a fragmentary side elevation of the same.

Figure 4 is a fragmentary vertical longitudinal section, on an enlarged scale, taken on line 4—4 Fig. 1.

Figures 5 and 6 are fragmentary vertical transverse sections, taken on the correspondingly numbered lines in Fig. 4.

In the following description similar characters of reference indicate like parts in the several figures of the drawings:—

Referring to the drawings, the numeral 10 indicates generally a draft vehicle, such as a motor-operated truck, which is connected by means of the improved coupling forming the subject of this application with a trailer 11 which is adapted to carry the load to be transported.

This truck may be of any suitable and well-known construction and includes a main frame 12, and rear supporting wheels 13 mounted under the rear part of the main frame and adapted to be propelled over the roadway by means of a motor of usual construction mounted on the main frame and operatively connected with said wheels.

The trailer may also be of any desired construction to support the character of the load imposed upon the same, but in the drawings the body of this trailer is more particularly designed for transporting automobiles for the trade, which body in its preferred construction comprises a frame 14 provided at its rear end with wheels whereby the same runs over the ground, while the upper part of its front end is provided with a forwardly projecting bridge 15 which overhangs the rear part of the truck frame.

Although my improved coupling for operatively connecting the truck and trailer may be variously designed for accomplishing the intended purpose, the same has been satisfactorily constructed in the manner shown in the drawings, which is as follows:—

The numeral 16 represents a longitudinal draft bar or drag link which is pivotally connected at its front and rear ends with the rear part of the truck and the front part of the trailer so that the pulling and pushing power of the truck is transmitted to the trailer and the truck and trailer are maintained a definite distance from each other, so far as the pivotal connections of this draft bar and the truck and trailer are concerned. For the purpose of producing a draft bar which is very strong and durable and yet light, the same is preferably constructed of upper and lower channel-shaped members 17, 18 of different sizes which are fitted lengthwise one within the other, and thereby form a hollow or tubular link or bar which is substantially rectangular in cross section, as best shown in Figs. 4, 5 and 6, which is very light but strong so as to be able to carry the strains which are imposed upon the same in use.

These two bar members may be connected with each other in any desired manner, such as welding or otherwise. In the preferred construction the means whereby the front and rear ends of this draft bar are pivotally connected with the truck and trailer have the form of universal joints so that the truck and trailer are free to assume various angular positions relative to each other while moving over uneven surfaces on the road and thus avoid cramping or possibly breaking or injuring any of the parts. For this purpose the rear part of the truck frame is provided with a base 19 and the bridge which forms the front part of the trailer body is provided with a base 20, and these bases are connected with the front and rear ends of the draft bar 16 by means of universal joints which are identical in construction, and the following description of one will therefore apply to both.

Projecting upwardly from each of the bases 19 and 20 is an upright post or pivot pin, each of which has its lower part 21 provided with a reduced neck 22 which is secured to the respective base by means of a clamping nut 23. This pivot post or pin projects upwardly through an opening in the respective end of the draft bar and is provided on its central part with a spherical portion or knuckle 24 which engages with a spherical seat 25 formed on the respective end of the draft bar. On its underside and around each pivot post the draft bar is reinforced by means of a disk 26 which is secured thereto by welding or otherwise.

Each seat or socket 25 of the draft bar is yieldingly held in engagement with the spherical member 24 of the adjacent pivot post by means of a spring 27 surrounding the upper reduced part 28 of the pivot post and bearing at its lower end against the top of the draft bar while its upper end engages with a downwardly facing shoulder formed on the upper end of the pivot post by means of a screw nut 29 which is applied thereto so as to permit of adjusting the tension of the spring 27 to suit requirements.

By these means universal joints are produced between opposite ends of the draft bar and the truck and trailer whereby the motion of the truck is reliably transmitted to the trailer and yet permits the truck and trailer to move angularly one with reference to the other in all directions without cramping any of the parts, and also without permitting these joints to become loose or rattle.

For the purpose of controlling the position of the trailer and truck relatively to each other when travelling straight over the road or when making a turn in either direction, a controlling mechanism is provided which embodies my improvements and which is preferably constructed as follows:—

The numeral 30 indicates generally a longitudinal controlling bar which is composed of a front section pivoted to the truck body and a rear section which is rigidly connected with the trailer body, these sections being slidable lengthwise relative to each other in the form of a telescopic joint in order that they may adapt themselves to variations in the relative positions of the truck and trailer.

The front section or member of this controlling bar 30 is preferably fabricated from two channel-shaped bars 31, 32 which are of different sizes in cross section and secured one within the other by means of welding or otherwise, as shown in Figs. 4, 5 and 6, so that this section of the controlling bar is of substantially rectangular form and tubular or hollow in cross section. The rear section of the controlling bar is preferably fabricated by means of an upper longitudinal bar member 33 which is channel-shaped in cross section, and a lower plate 34 which is connected by welding or otherwise with the lower edges of the flanges of the bar member 33 for the purpose of forming a tubular structure which is rectangular in cross section and forms a guideway for the front section of the controlling bar which is slidingly fitted therein in a longitudinal direction, as shown in Fig. 6.

The front and rear sections or members of the controlling bar are capable of sliding lengthwise one relatively to the other, but owing to the angular cross section of the cooperating telescopic parts of the same, these members are incapable of turning one with reference to the other.

The pivotal connection between the front section or member of the controlling bar and the frame of the truck may be variously constructed, but in its preferred form the same is so designed that it forms a universal joint between the truck frame and the front section of the controlling bar so that the truck and trailer will be free to assume an angular position both horizontally and vertically with reference to each other without causing the connection between the truck and trailer to be strained in any way. The particular form of this universal joint, as best shown in Figs. 4 and 5, is as follows:—

The numeral 35 is a vertical pivot pin which passes with its upper end through the front part of the front section of the controlling bar and is secured thereto by means of a nut 36, and extends from the underside of this bar section through a horizontal guide platform 37 on the rear part of the truck frame. Underneath the front section of the controlling bar the pivot pin 35 is provided with a spherical portion 38 which engages with a correspondingly shaped socket or seat 39 on the platform 37. This spherical portion and seat are yieldingly held in engagement with each other by means of a spring 40 surrounding the lower part of the pivot pin 35 and engaging its upper end with the underside of the platform 37 while its lower end engages with an upwardly facing shoulder on this pin formed by a screw nut 41 working on the lower threaded end of the pin 35 so that the tension of this spring can be adjusted to suit varying conditions.

As the truck and trailer turn horizontally one with reference to the other the load on the front end of the trailer is supported on the platform 37 and the telescopic controlling bar moves transversely over the upper side of this platform. Wear on this controlling bar, however, is prevented by providing the underside of its rear section with a wear plate 42 of metal which is preferably secured to the underside of the rear controlling bar section by welding or other suitable means, and this wear plate slides horizontally and transversely on the upper surface of the platform 37 which is also made of metal.

The pivotal connection between the front section of the controlling bar and the rear part of the truck body is arranged between the pivotal connections whereby the front and rear ends of the draft bar are connected with the truck frame and the trailer frame. Assuming now that the truck and trailer equipped with my improved coupling are moving in a straight line over a roadway, as shown in Figs. 1 and 3, the pivotal connections of the draft bar or link with the truck and trailer frames and the pivotal connection between the front section of the controlling bar and the truck frame are all arranged in a longitudinal vertical plane. In this position the pivotal connection between the front end of the draft bar and the truck frame will be arranged farthest forward from the pivotal connection between the front section of the controlling bar and the truck frame, whereby the vertical front wall 43 of the trailer frame will be located a considerable distance in rear of the rear wheels of the truck and its frame and adjacent parts.

If now the truck is turned to the left of the road, as indicated in Fig. 2, about a vertical axis which, for example is represented by the pivot pin 35, then the pivotal connection between the front end of the draft bar 16 and the truck frame will be moved rearwardly relative to the axis of the pivot pin 35, thereby causing the draft bar to be moved rearwardly bodily and thus cause the body of the trailer to be also pushed backwardly a corresponding extent, during which movement the rear section of the controlling bar slides rearwardly on its companion front section.

The extent of this rearward movement of the trailer relative to the truck is so determined that it will be sufficient to permit the front vertical wall 43 of the trailer body to clear the rear wheel on the inner side of the truck body. In Fig. 2 the truck is represented as being turned to an angle of 45° relative to the trailer, and the rear part of the wheel of the truck on that side toward which the latter is turned is represented as clearing the front wall 43 of the trailer body. If now the truck is turned still further about the pivot pin 35 as a vertical axis, then the draft link or bar 16 will push the trailer back still further and always to the requisite extent to prevent the rear part of the respective truck wheel or adjacent parts of the truck from coming in contact with the front wall of the trailer body.

By these means, therefore, the trailer body is at all times prevented from swinging laterally during a turning operation into such a position as would permit the front wall of the trailer to strike or contact any part of the truck, whereby interference between the truck and trailer are positively avoided while operating the same over the road, but at the same time permitting the trailer to be coupled very closely with the truck so as to insure the best handling of the truck and trailer.

Moreover, this is accomplished in a manner which will compel the trailer to track in a definite position behind the truck and thus prevent the trailer from whipping or swaying either in one direction or the other and interfering with other traffic, or rendering the hauling of the same by the truck irregular.

Due to such close coupling of the truck with the trailer without liability of conflict between the two, the extreme length of the truck and trailer can be materially shortened which reduces the amount of road-space occupied by the same, and not only insures greater facility of operation but also permits the same to be parked in a shorter space than otherwise would be required.

These advantages are obtained in the present invention by means which are comparatively simple in construction and by the use of structural metal of standard forms which are readily available, thereby enabling this improvement to be utilized at comparatively low cost.

Furthermore, this coupling contains no delicate parts which are liable to get out of order, but instead all the parts are of sturdy construction which are capable of withstanding the maximum strains likely to be imposed upon the same, and those parts subject to wear are easily accessible and can be readily replaced at small expense.

I claim as my invention:—

1. A coupling for connecting a truck and a trailer, comprising a draft bar pivotally connected by universal joints at its front and rear ends with said truck and trailer, and a controlling device having front and rear sections which are free to slide lengthwise relatively to one another, the front sections of said controlling device being pivotally connected by a universal joint with said truck between the front and rear pivotal connections between said draft bar and truck, and the rear section of the controlling device being rigidly connected with said trailer.

2. A coupling for connecting a truck and a trailer, comprising a draft bar pivotally connected by universal joints at its front and rear ends with said truck and trailer and a controlling device having front and rear sections which are free to slide lengthwise relatively to one another, the front section of said controlling device being pivotally connected by a universal joint with said truck between the front and rear pivotal connections between said draft bar and truck, and the rear section of the controlling device being rigidly connected with said trailer, said bar including two channel-shaped bar members fitting lengthwise one within the other.

3. A coupling for connecting a truck and a trailer, comprising a draft bar pivotally connected by universal joints at its front and rear ends with said truck and trailer, and a controlling device having front and rear sections which are free to slide lengthwise relatively to one another, the front section of said controlling device being pivotally connected by a universal joint with said truck between the front and rear pivotal connections between said draft bar and truck, and the rear section of the controlling device being rigidly connected with said trailer, the front section of said controlling device including two channel shaped bar members fitting lengthwise one within the other, and the rear section of said controlling device including an upper channel shaped member and a lower plate member secured to the flanges of said channel shaped member and forming therewith a longitudinal tube which is of rectangular form in cross section and receives the draft bar of similar form in cross section.

4. A coupling for connecting a truck and a trailer, comprising a draft bar pivoted at its front and rear ends on said truck and trailer, a controlling device including front and rear sections slidable lengthwise upon one another and having its front section pivoted to the truck and its rear section rigidly secured to the trailer, and a platform which is secured to said truck and which is slidingly engaged by one section of said controlling device upon moving the truck and trailer transversely one relatively to the other.

5. A coupling for connecting a truck and a trailer, comprising a draft bar pivoted at its front and rear ends on said truck and trailer, a controlling device including front and rear sections slidable lengthwise upon one another and having its front section pivoted to the truck and its rear section rigidly secured to the trailer, a platform which is secured to said truck and which is slidingly engaged by one section of said controlling device upon moving the truck and trailer transversely one relatively to the other, and a wear plate interposed between said platform and the respective section of said controlling device.

6. A coupling for connecting a truck and a trailer, comprising a draft bar pivotally connected at its front and rear ends with said truck and trailer, and a controlling device including front and rear sections slidable lengthwise relatively to one another and the front section being pivoted to said truck and the rear section being secured to said trailer, the pivotal connections between said draft bar and the truck and trailer including spherical sockets arranged at opposite ends of the draft bar, and upright posts arranged on the truck and trailer and each having a spherical portion which is seated in the correspondingly shaped seat at the respective end of the draft bar.

7. A coupling for connecting a truck and a trailer, comprising a draft bar pivotally connected at its front and rear ends with said truck and trailer, and a controlling device including front and rear sections slidable lengthwise relatively to one another and the front section being pivoted to said truck and the rear section being secured to said trailer, the pivotal connections between said draft bar and the truck and trailer including spherical sockets arranged at opposite ends of the draft bar, upright posts secured at their lower ends to said truck and trailer, respectively, and projecting upwardly through the opposite ends of said draft bar and each post provided between its upper and lower ends with a spherical portion engaging with the spherical seat in the corresponding end of the draft bar, and a retaining spring surrounding the upper part of each post and bearing at its opposite ends against the top of the draft bar and a downwardly facing shoulder on the respective post.

8. A coupling for connecting a truck and a trailer, comprising a draft bar pivotally connected at its front and rear ends with said truck and trailer, and a controlling device including front and rear sections slidable lengthwise relatively to one another and the front section being pivoted to said truck and the rear section being secured to said trailer, the pivotal connection between the front section of said controling device and the truck including a spherical member secured to said front section, and a spherical socket which is formed on the truck and in which said spherical member is seated.

9. A coupling for connecting a truck and a trailer, comprising a draft bar pivotally connected at its front and rear ends with said truck and trailer, and a controlling device including front and rear sections slidable lengthwise relatively to one another and the front section being pivoted to said truck and the rear section being secured to said trailer, the pivotal connection between the front section of said controlling device and the truck including a pivot pin secured to said front section and provided with a spherical member, a guide platform arranged on the truck and having a spherical socket which is engaged by said spherical member, and a spring surrounding said pivot pin and bearing at its opposite ends against said guide platform and a shoulder on said pivot pin.

DALE D. ARNER.